APPARATUS FOR REPRODUCING IMAGES IN COLOR

Filed Oct. 11, 1951 2 Sheets-Sheet 1

INVENTORS
PETER H. WERENFELS
& JAMES E. ECKERT

ATTORNEY

INVENTORS
PETER H. WERENFELS
& JAMES E. ECKERT
BY [signature]
ATTORNEY

Patented July 21, 1953

2,646,528

UNITED STATES PATENT OFFICE 2,646,528

APPARATUS FOR REPRODUCING IMAGES IN COLOR

Peter H. Werenfels, Lawrenceville, and James E. Eckert, Princeton, N. J., assignors to Radio Corporation of America, a corporation of Delaware Application October 11, 1951, Serial No. 250,868

2 Claims. (Cl. 315—24)

This invention relates to improved cathode ray tube apparatus for reproducing images in color.

A kinescope for reproducing images in color in response to electrical signals has been devised in which the beam of electrons rotates about the path to the target that it would follow in the normal kinescope. However, the beam is focussed so that it strikes the same spot as a normal beam. Hence the beam can be thought of as generating a surface of revolution of nearly conical shape having its apex scanning the target. The rotation of the beam thus causes the electrons of the beam to approach each point of the target from constantly varying directions in addition to the change in direction resulting from the scanning action. The target is constructed so that the primary color emitted in response to the beam of electrons depends on the direction of approach of the beam with respect to the path that would be followed in a normal kinescope wherein the beam is not rotated. The changes in direction due to the beam scansion do not produce any changes in color. The colors are therefore reproduced in a given sequence as the beam rotates.

As pointed out in the U. S. patent application bearing Serial No. 220,622 filed on April 12, 1951, in the name of Sziklai, Schroeder and Bedford, improved results can be obtained if the transmitted signal represents the primary colors in one sequence during one interval of time and a reverse sequence during another interval of time.

Accordingly, it is an object of the present invention to render apparatus of the type described above capable of reproducing images in color from transmitted signals representing different sequences of primary colors during different intervals of time.

Briefly this objective may be attained if means are provided for reversing the direction of rotation of the beam about the path it would follow in a standard kinescope when the transmitted signal represents the primary colors in reverse sequence.

Figure 1:
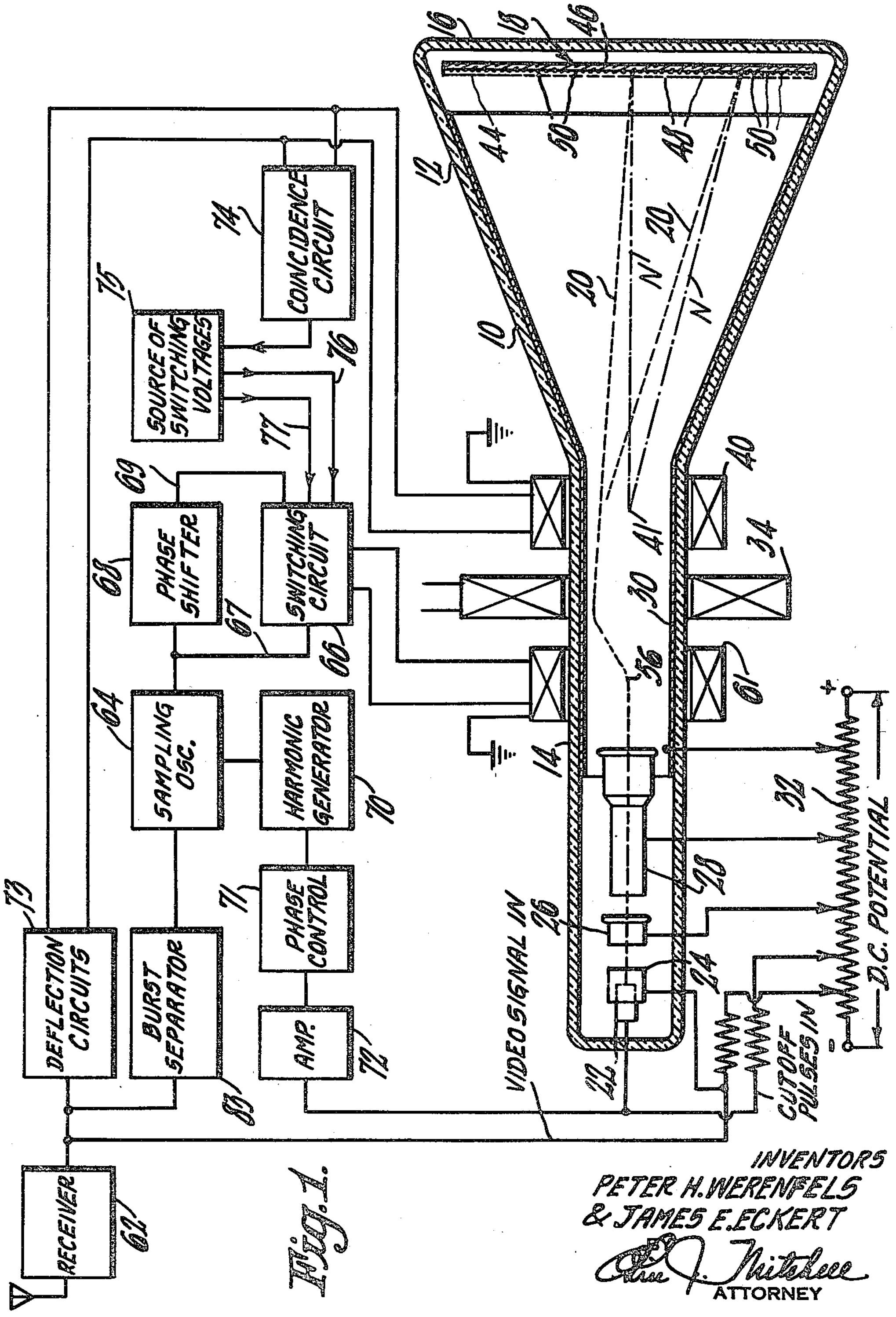
Figure 1A:
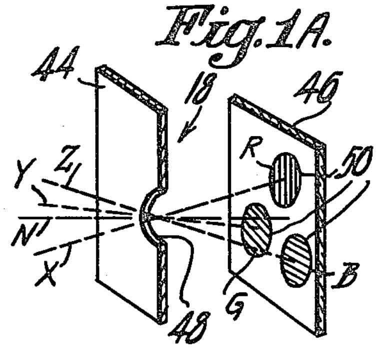
Figure 1B:
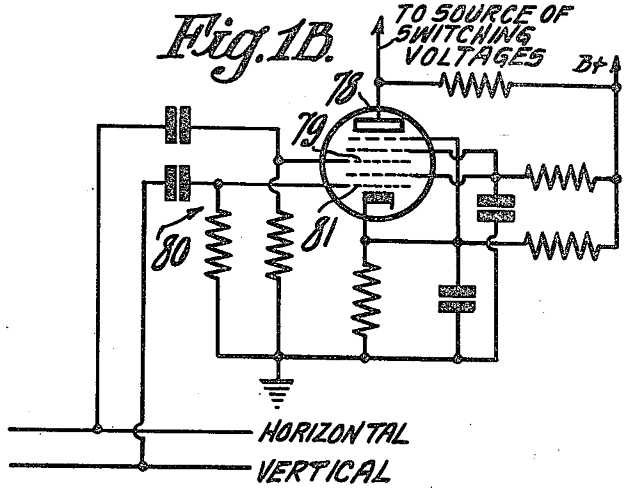
Figure 2:
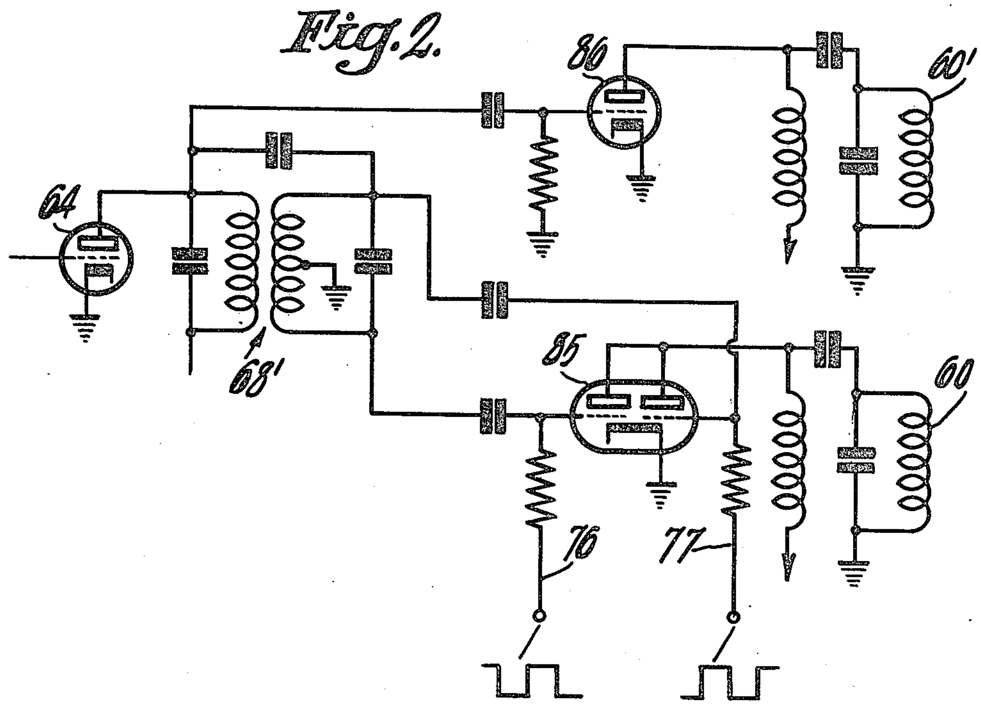

The manner in which this objective may be reached will be better understood from the detailed description of the drawings in which:

Figures 1 and 1A illustrate the details of a color kinescope that may be employed in the combination that is the subject of this invention, and Figure 1B illustrates the details of a coincidence circuit that may be empoyed, and Figure 2 illustrates a circuit that may be employed in accordance with the invention to effect the reversal of rotation of the beam in the kinescope illustrated in Figures 1, 1A and 1B.

Referring to the drawings, Figure 1 shows a previously developed cathode ray tube of a type to be used in the invented combination. The tube consists of an evacuated envelope 10, having both a conical portion 12 and a tubular neck portion 14 coaxially joined together as shown. The conical portion 12 of the envelope is closed by a face plate 16 and closely spaced from it is a fluorescent target and screen structure 18 to be described below. Mounted coaxially within the tubular envelope portion 14 is an electron gun structure for producing and focusing a beam of electrons 20 on the screen structure 18. The electron gun is of conventional design and consists of a cathode cylinder 22 closed, as is shown, at the end facing the target screen 18. The closed end of the cathode cylinder is coated, as is well known in the art, by a mixture of strontium and barium oxides which, when heated to an appropriate temperature, produce a free emission of electrons.

A control grid cylinder 24 coaxially surrounds the electron emitting end of the cathode 22 and has an apertured plate structure closing one end thereof and closely spaced from the coated surface of the cathode. A shield electrode or grid 26 constitutes a short thimble-like electrode having an aperture in the bottom thereof for the passage of electrons therethrough. Spaced along the tubular neck portion 14 and coaxial with the other electron gun parts is a tubular first anode electrode 28, having an enlarged portion at the end facing the fluorescent screen 18. A second anode electrode is formed by a conductive coating 30 on the inner surface of the tubular envelope portion 14 and extends into the conical envelope portion 12 to a point adjacent the fluorescent screen 18. The several electrodes described, which constitute the electron gun structure of the tube are connected to a source of direct current potential which may be a voltage divider 32 connected between the positive and negative points of a direct current potential source.

The electrostatic fields produced respectively between electrodes 26 and 28, and 28 and 30, are of a converging nature and cause the electrons to form into a beam having a minimum cross section or cross-over point 56 between the tubular electrode 28 and the screen 18. The electron beam, after passing through this cross-over point 56, tends to diverge before striking the screen 18. The diverged beam is bent away from the central axis of the tube by a rotating radial magnetic field. As is well known in the art, such a field can be generated by applying current of one phase to a first pair of coils that are diametrically mounted about the neck of the tube and applying current of a different phase to a second pair of coils that are mounted with their axis at 90° to the first pair. For simplicity the coils are shown as one yoke 61. The focusing coil 34 serves to converge the electrons within the beam and also to direct the beam to the same point on a mask 44 that the beam would have been struck if the coils of yoke 61 were not used. Thus the beam substantially generates a cone of revolution having an apex at a mask 44.

The electron beam 20 and hence the apex of the cone of revolution may be caused to scan over the surface of the mask 44 in any desired pattern or raster. However, in tubes of this type, the conventional scanning consists of parallel lines from top to the bottom of the screen 18. The scanning of the beam is produced by scanning fields established by two pairs of scanning coils included in the yoke 40. Each pair of coils is connected to well known circuits 73 producing saw-tooth currents for providing both line and frame scansion of the beam.

In the screen structure 18 the masking electrode 44 is positioned in front of a transparent phosphor supporting sheet 46. The masking electrode 44 is formed from thin metallic foil which is opaque to the electrons of the beam 20. A plurality of apertures 48 are formed through the metal foil of the masking electrode 44. Supported on the surface of the transparent plate 46 are areas 50 of phosphor coating which are positioned in the path of the beam 20 passing through apertures 48.

In the enlarged section of the screen 18 shown in Figure 1A it can be seen that if the electron beam approaches the target from any one of the directions indicated as X, Y, or Z, the electrons of the beam will pass through the apertures of the masking electrode 44 and strike those phosphor spots which are in line with the beam path coincident with these directions. When the beam approaches the target along a path "X" it strikes only those phosphor coated spots indicated by "R," which luminesce with a red light. In a similar manner, when the beam approaches the target along path "Y," it strikes only those areas indicated by the letters "G" which luminesce with a green light. If the tube is a three color tube, the electrons of the beam approaching the target along a path "Z" will strike those phosphor areas indicated by the letter "B," which luminesce with a blue light.

Thus, the combined effects of the rotating field of coils of yoke 61 and that of the focusing coil 34 results in beam 20 being first displaced from its normal path and then redirected along a new path to strike the surface of the target 18 from sequentially different directions and accordingly strikes the phosphor spots in sequence.

The following description relates to the circuits associated with the color kinescope described above. The signals that sequentially represent the color in the scanned scene are detected by any suitable receiver 62 and are applied to the control grid 24 so as to vary the intensity of the beam 20. Alternating current of beam rotational frequency is applied directly from an oscillator 64 to a switching circuit 66 via lead 67. The output of the oscillator 64 is also supplied to the switching circuit 66 indirectly via a 90° phase shifter 68 and lead 69. Details of suggested switching circuits will be discussed in connection with Figure 2. One end of the yoke 61 is grounded. The switching circuit 66 acts as a double pole double throw switch whereby the ungrounded end of one coil may be connected to the lead 67 and the ungrounded end of the other coil may be connected to the lead 69 and vice versa. In this way the phase of the currents supplied to the coils may be interchanged and so reverse the direction of rotation of the resultant radial magnetic field established by the yoke 61 as well as the direction of rotation of the beam 20.

In order that the beam 20 be turned on only when it strikes a single phosphor spot 50, the third harmonic of the output of the sampling oscillator 64 is developed by a harmonic generator 70 and applied to the cathode 22 in suitable phase and amplitude via a phase control 71 and an amplifier 72. The positive peaks of this harmonic keying wave overcome the beam cut off bias between the grid 24 and the cathode 22 so as to key the beam on only when it strikes a single one of the phosphor spots 50.

When the signals applied to the grid 24 from the output of the receiver 62 represent a given primary color the beam 20 should strike the phosphor spot that emits that color. In the system wherein the present invention is applicable, a burst of energy of color sequence or beam rotational frequency is inserted on the back porch of the television signal at the transmitter. This energy of beam rotational frequency has a fixed phase relationship to the sequential change in color information of the transmitted wave. A burst separator 83 separates out the burst in a manner described in RCA Bulletins on Color Television and UHF, October 1949 to July 1950, and employed to control the phase of the alternating current supplied by the sampling oscillator 64 in any well known manner. The phase of the burst may not be the same as the signals representing a primary color, and any difference can be accommodated by the phase control 71 so that the red spot of phosphor is struck by the beam when the transmitted signal represents red, etc. Further details of the color synchronizing system are not included as they are not believed necessary to the understanding of the present invention.

The following description relates to a way of changing the polarity of the switching circuit 66 and hence the direction of beam rotation between successive fields. Horizontal and vertical deflection waves are derived from the output of the receiver 62 by standard deflection circuits 73 and applied to the horizontal and vertical deflection coils of the yoke 40 respectively. During beam retrace, rapidly collapsing magnetic fields in the deflection coils of the yoke 40 produce voltage pulses of high amplitude and in the opposite direction to the deflection waves supplied by the deflection circuits 73. If standard odd line interlace is employed, these horizontal and vertical "flyback" pulses occur simultaneously at the beginning of every other field. The "flyback" pulses are applied to a coincidence circuit 74 that produces a control pulse only when the pulses coincide. The control pulse is applied to the source of switching voltages 75. This latter source may be a bistable multivibrator having two outputs that are 180° out of phase. One phase is applied to the switching circuit 66 via lead 76 and the other is applied to the switching circuit 66 via lead 77. When a pulse appears at the output of the coincidence circuit 74 the bistable multivibrator 75 is triggered into its other stable state and the plurality of the signals appearing on leads 76 and 77 reverses.

One type of coincidence circuit that may be used is illustrated in Figure 1B. A multigrid tube 78 is biased to cut off by placing a positive potential on its cathode as shown. The horizontal "flyback" pulses are applied to a grid 79 by an ordinary RC coupling. The vertical "flyback" pulses are differentiated by an RC coupling network 80 before being applied to a grid 81. When the two "flyback" pulses occur simultaneously, the cut off bias on the cathode of the tube 78 is overcome, and a pulse appears at its plate. It is this pulse that triggers the bistable multivibrator 75. The oppositely phased outputs of the multivibrator 75 are applied to the switching circuit 66 via leads 76 or 77 as noted above.

Figure 2 illustrates one form that the switching circuit 66 may assume. In this arrangement, the sampling frequency is supplied by sampling oscillator 64 to a phase shifter 68. The center of the coil in the right hand tuned circuit is grounded so that the sampling frequency voltage at the upper end of the coil is 90° out of phase with the sampling frequency voltage supplied by oscillator 64 and the sampling frequency in the lower end of the coil is 270° out of phase with the sampling frequency supplied by oscillator 64. The 90° phase of the sampling voltage is supplied to the grid of one side of a double triode 85 and the 270° phase of the sampling voltage is applied to the grid of the other side. The plates of the double triodes are coupled to the coil 60. The switching voltage on the lead 76 is applied to the grid of the left hand triode of the double triode 85 and the switching voltage on the lead 77 is applied to the other triode section. Thus when one triode section is conducting, the other is non-conducting. When the left hand side of the double triode 85 is conducting, the 270° phase of the sampling frequency is applied to the coil 60, and when the right hand side of the double triode 85 is conducting, the 90° phase of the sampling frequency is applied to the coil 60. The sampling frequency provided by the oscillator 64 is applied directly to the other coil 60′ via the amplifier 86. Thus it is seen that the upper coil 60′ always receives the zero degree phase voltage and that the lower coil 60 may be energized by 90° current or by 270° current. This causes the resultant field of the two coils 60 and 60′ to reverse its direction of rotation.

What is claimed is:

1. Apparatus for reproducing images in color comprising in combination an electron gun adapted to project a beam of electrons, a target positioned so as to intercept said electrons, said target also being adapted to reproduce one of several different primary colors depending on the direction of approach of the beam at any point of the target, means adapted to cause said beam to rotate in a given direction about its normal position so as to continuously change the direction of approach to any part of said target, and means for reversing the direction of rotation of said beam during desired intervals, and means adapted to cause said rotating beam to scan a raster on said target.

2. Apparatus for reproducing images in color comprising an electron gun adapted to project a beam of electrons, a target positioned so as to intercept said beam, said target being adapted to emit light having a color depending on the direction of approach of said beam of electrons toward said target, means for causing said beam of electrons to scan a raster on said target, means adapted to cause said beam of electrons to rotate in a given direction as it scans said target during one interval of time, and means adapted to cause said beam of electrons to rotate in the opposite direction as it scans said target during another interval of time.

PETER H. WERENFELS.
JAMES E. ECKERT.

References Cited in the file of this patent

UNITED STATES PATENTS

| Number | Name | Date |
|---|---|---|
| 2,395,966 | Goldberg | Mar. 5, 1946 |
| 2,426,208 | Hardy | Aug. 26, 1947 |
| 2,464,558 | Dammers | Mar. 15, 1949 |
| 2,474,177 | Wild | June 21, 1949 |
| 2,527,718 | Grass | Oct. 31, 1950 |
| 2,532,435 | Allen | Dec. 5, 1950 |
| 2,538,494 | Barton | Jan. 16, 1951 |
| 2,577,368 | Schultz et al. | Dec. 4, 1951 |

FOREIGN PATENTS

| Number | Country | Date |
|---|---|---|
| 589,345 | Great Britain | June 18, 1947 |
| 736,575 | Germany | Mar. 13, 1943 |